United States Patent [19]
Davenport

[11] Patent Number: 5,555,823
[45] Date of Patent: Sep. 17, 1996

[54] METHOD AND APPARATUS FOR FEEDING WASTE MATERIAL TO A DRY KILN

[76] Inventor: Ricky W. Davenport, P.O. Box 52154, Lafayette, La. 70505-2154

[21] Appl. No.: 300,077

[22] Filed: Sep. 2, 1994

[51] Int. Cl.$^6$ .................................. F23G 5/22; F27B 7/32
[52] U.S. Cl. ...................... 110/346; 110/226; 110/246; 110/104 R; 110/110
[58] Field of Search .................................. 110/246, 346, 110/226, 232, 220, 222, 258, 104 B, 101 R, 110; 588/19, 257; 34/136

[56] References Cited

U.S. PATENT DOCUMENTS

| | | | |
|---|---|---|---|
| 4,750,437 | 6/1988 | Rouse | 110/346 |
| 4,850,290 | 7/1989 | Benoit et al. | 110/346 |
| 4,930,965 | 6/1990 | Peterson et al. | 414/149 |
| 4,969,407 | 11/1990 | Benoit et al. | 110/346 |
| 5,083,516 | 1/1992 | Benoit et al. | 110/344 |
| 5,086,716 | 2/1992 | Lafser, Jr. | 110/346 |
| 5,224,433 | 7/1993 | Benoit et al. | 110/346 |
| 5,257,586 | 11/1993 | Davenport | 110/246 |
| 5,257,587 | 11/1993 | Ohlsen et al. | 110/346 |
| 5,372,458 | 12/1994 | Flemmer et al. | 110/346 X |
| 5,405,537 | 4/1995 | Goff et al. | 110/346 X |

*Primary Examiner*—Henry A. Bennett
*Assistant Examiner*—Susanne C. Tinker
*Attorney, Agent, or Firm*—Robert N. Montgomery

[57] ABSTRACT

A method and apparatus for receiving, processing, and delivering waste materials to the interior of a rotary cement kiln to be burned therein. Apparatus includes a feeding mechanism which provides continuous in-feed of entrained solids or solid waste, materials including hazardous waste material having low fuel value, directly into the calcining zone of the kiln. A bulk receiving system is provided for receiving, processing and transferring materials from one or more collection stations. The system further includes processing for sizing and segregating metal extracted from a contaminated hazardous waste stream. Methods are provided for providing induction of forced, combustion air directly into the calcining zone of a rotating cement kiln.

42 Claims, 12 Drawing Sheets

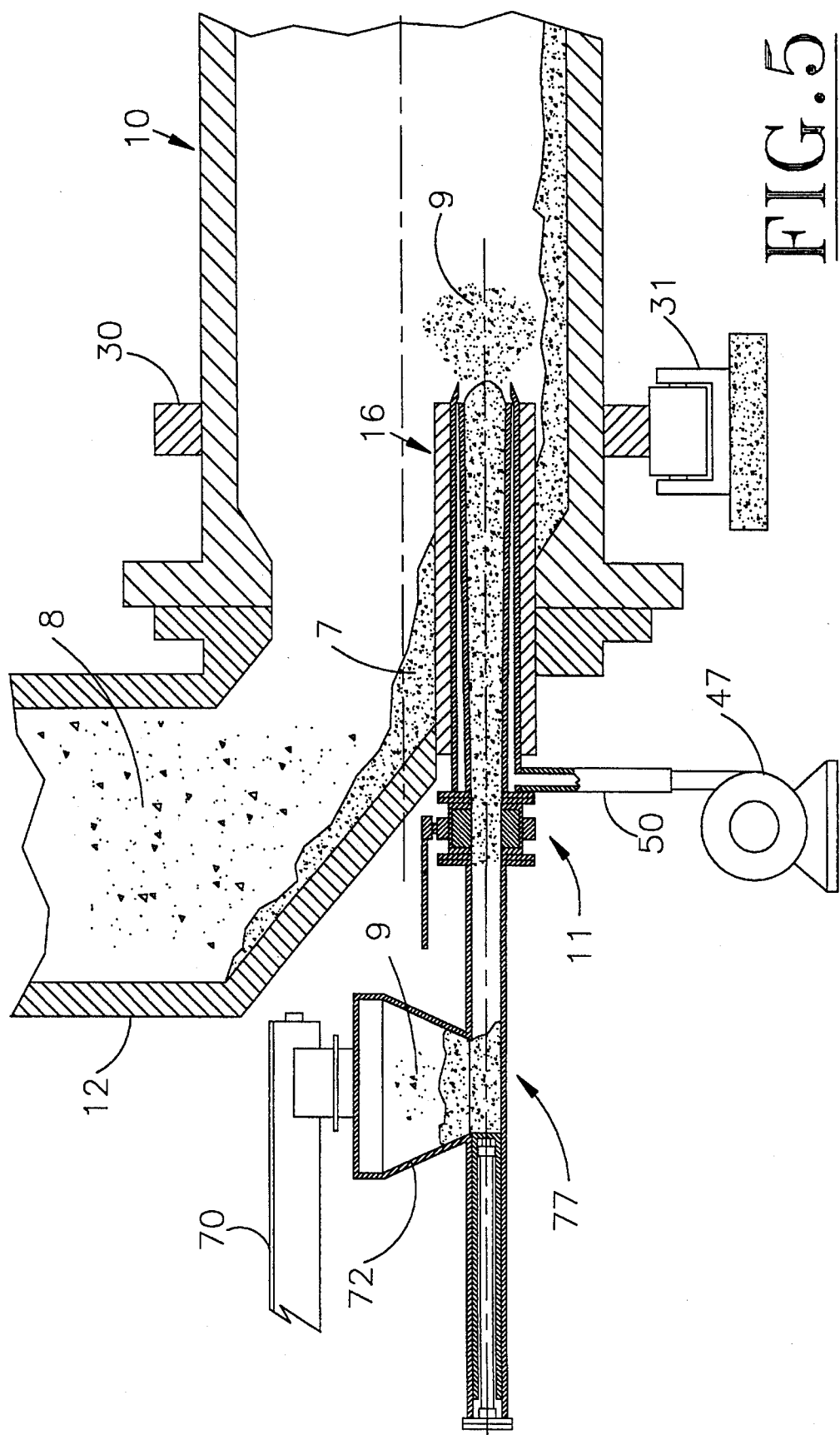

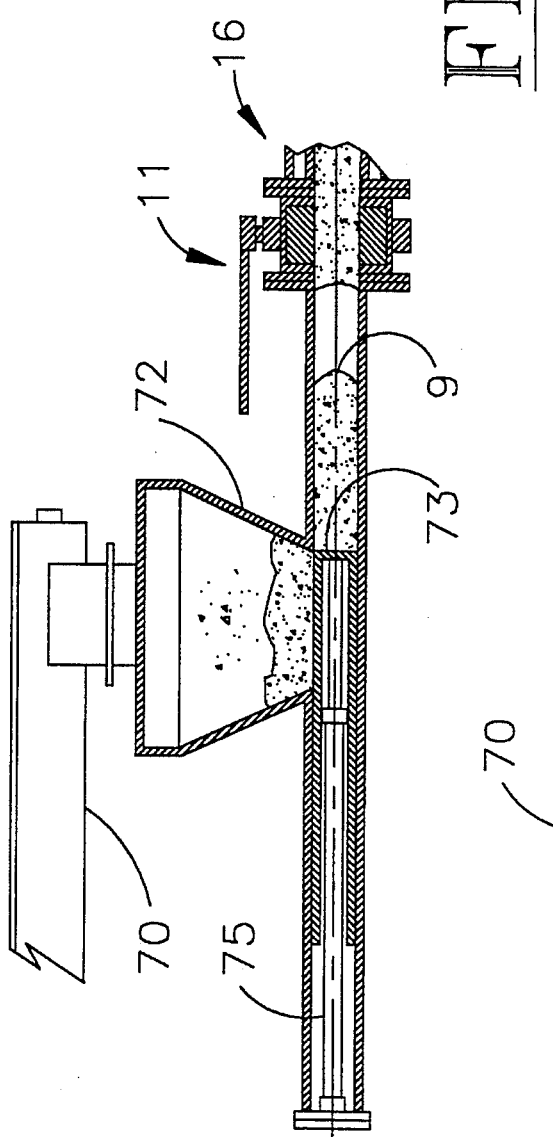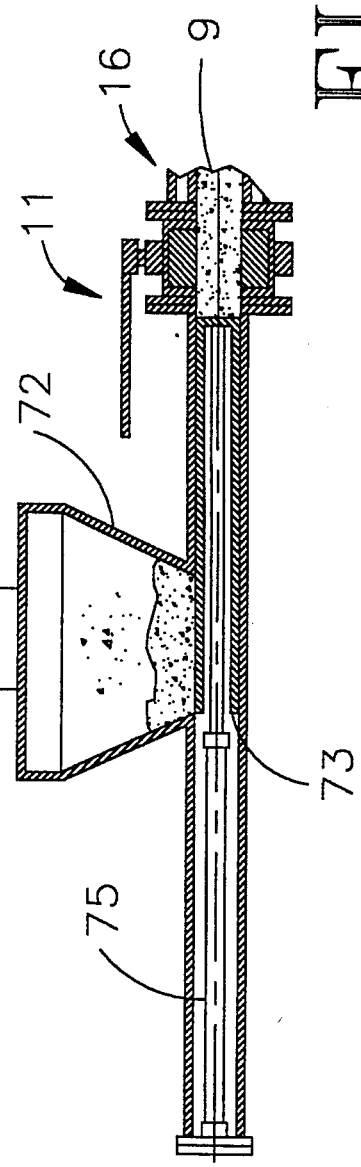

METHOD AND APPARATUS FOR FEEDING WASTE MATERIAL TO A DRY KILN

BACKGROUND OF THE INVENTION

1. Field of the Invention

The present invention relates to the introduction of waste materials into rotating devices such as cement kilns in general and more particular to an improved method and apparatus for continuous introduction and burning of hazardous waste in rotary, cement kilns of the dry type.

2. General Background

The apparatus and feeding system disclosed herein are applicable to situations where a need exists to feed waste materials into a rotating cylinder at or near its stationary, material, input end in a continuous and controlled manner. The application of the feeding system is not, however, restricted to the feeding of fuel grade materials alone. The system is capable of metering raw material or chemical additives into rotating cylinders from a stationary location. Kiln dust, fly ash and many other raw materials can be beneficially utilized by the continuous introduction of such materials directly into the calcining zone of a cement kiln. Horizontal, rotary reactors and mixers utilized in the chemical industry can use the feeding system to introduce chemical additives at strategic steps in the reaction process.

The range of applications for the improved, rotary kiln, feeding apparatus disclosed herein is quite broad. The preferred embodiment disclosed, however, is specifically designed to be utilized by cement kilns and aggregate kilns in the feeding and burning of waste material as a means of thermal destruction as well as energy recovery.

There are two types of cement kilns, one wet the other dry. The present invention is related to dry type kilns and more particularly to preheat kilns because the calcining zone is located at or near the mineral's point of entry. Dry kilns occur in many forms. Some dry kilns operate in much the same way as wet kilns except the minerals are introduced in dry powder form. Long dry kilns of this type are more energy efficient than wet kilns for obvious reasons. The newer more efficient dry kilns employ a vertical preheating tower prior to entry of the minerals into the kiln itself. Hot combustion gases flow from the kiln upwards through the preheat tower while dry powdered minerals cascade downward. The countercurrent flow of combustion gases preheats the minerals prior to entry into the kiln, and for this reason, preheater kilns are usually much shorter in length, usually in the range of 150 to 250 feet. A further improvement in preheater technology includes the introduction of hot combustion gases from a separate burner mounted in the first stage of the preheat tower. With this arrangement, calcining of the minerals begins in the preheater tower, and it finishes in the kiln. Precalcining kilns represent the latest technology to date and are the most energy efficient. Such kilns produce a calcining zone in excess of the required 1800 degrees F. to produce complete thermal destruction and are accessible from a stationary point at the riser duct connecting the kiln to the preheater tower. It is for the above reasons that such dry type, cement kilns function as excellent incinerators. Therefore, the concept of burning hazardous waste is becoming more and more economically viable. The role of the cement industry in the thermal destruction of liquified hazardous waste has long been recognized. However, the present challenge in this industry is to burn organic sludge and solids that heretofore have been exclusively in the domain of the incinerators and landfills. It is to this end that the invention is addressed.

3. Discussion of the Related Prior Art

A good summary of the state of the industry with respect to the use of hazardous waste for fueling cement kilns is the article entitled "Cement Kilns 1990" published in *Environmental Information Digest,* June 1990, pages 14 to 23.

The closest relevant prior art is encompassed in U.S. Pat. Nos. 4,850,290; 4,930,965; 4,969,407; 5,224,433; 5,083,516 and 5,257,586. Most of these patents teach a single method and apparatus for the charging of containerized solid fuel, in the form of hazardous waste, into rotary kilns. One such embodiment utilizes the charging process, effecting entry into the calcining zone of a dry kiln through a port in the riser duct. Such charging is dependent on the opening and closing of a valve system to prevent escaping gases. The principle of the containerized hazardous waste depends heavily on the assumption that such waste must be blended to form hazardous waste homogenate prior to containerization, and that such containerization is essential to prevent overloading of the kiln gas stream with volatile organic matter. It has also been found that additional oxygenation is required in most cases where such charging is used, and in particularly in cases where improper blends of the waste homogenate is common. Only U.S. Pat. No. 5,083,516 teaches a continuous feed system utilizing a screw feeder and transfer means. However, this system is limited to use with infeed through commutation into the rotating portion of a kiln.

There are several problems associated with the prior art that has deterred its widespread use. First, the prior art technology requires that the waste be shredded and packed into six gallon containers. This requirement causes waste processors to spend large sums of money for materials and labor to containerize such materials and further needlessly exposes personnel to the hazardous materials. The process is slow and labor intense and has proven to be impractical to containerize large quantities of material. The intermittent introduction of the small containers results in irregular releases of energy and emissions thereby threatening the stable conditions within the kiln. The consistency of fuel quality varies from container to container regardless of how careful the mixer may be. Finally, the prior art technology requires the kiln to intake excess air at the point of entry of the waste materials, when supplied from the stationary end of a dry kiln, in an attempt to ensure adequate oxygen in the calcining zone to promote complete combustion of the solid fuel thus reducing the overall thermal efficiency of the kiln. It has been established that excess combustion air, introduced intermittently at the stationary inlet end of a rotary kiln, has a detrimental effect on the quality of the clinker (product material) produced by a cement kiln. It is therefore essential that combustion air be controlled and introduced directly into the calcining zone.

Several methods of burning waste materials in cement kilns are well known in the industry. They include: burning dispersed liquids in the primary burner, burning pneumatically conveyed solids in the primary burner, and finally, burning material injected into the calcining zone through the use of containerized material as discussed above. In each case it is essential to maintain primary burner flame temperatures in the 3,500 degree F. range in order to form quality clinkers (which must reach approximately 2650 degrees F. to properly transform). It is also essential that a heat value in the fuel be maintained at a minimum of 10,000 BTU's/Lb. in order to maintain the required flame temperature. This means that low BTU value solid waste becomes increasingly difficult to utilize in the primary burner. To do so requires that such waste material be blended with high BTU value material to yield the target value of 10,000 BTU's/Lb. The same problem exists when pneumatically conveyed solids are feed into the primary burner. Solid hazardous waste as a family tend to have low BTU values of between 5,000 and 7,500 BTU/LB, thus such materials are not ideally suited for burning in the primary burner, where fuel quality is a critical factor. In addition solids have a higher concentration of inorganic constituents than liquids; therefore, when they are burned in the primary burner such inorganic constituents (ash) tend to follow the combustion gas flow, down the center of the kiln and out into the kiln dust. As a result, there is often an unacceptable build up of inorganic contaminants in the kiln dust. The present invention has overcome the shortcomings of the prevailing technology in several significant ways. First, the present system provides for the direct feeding of combustion air and materials into the calcining zone, where the temperature is sufficiently elevated, usually between 950 degrees C. and 1200 degrees C., to provide thermal destruction of all organic constituents, without the need for containerization and off-site blending. It is a known fact that fuel grade material can be burned within the mineral bed of the calcining zone, resulting in a more efficient method of heat transfer to the minerals. It is, therefore, possible to use relatively low BTU value materials to enhance the temperature within the calcining zone. Moreover, it has been found that the mineral bed passing through the calcining zone, of a rotating cement kiln, becomes chemically reactive due to the dissociation of carbon dioxide from the limestone minerals used in manufacturing cement. As a result the mineral bed is at its most active at this location. The inorganic constituents contained in waste materials introduced directly into the calcining zone, chemically bond to the minerals passing through the calcining zone. As a result the low BTU value materials can be beneficially utilized as a fuel in the calcining zone without jeopardizing cement and kiln dust quality. Since solids tend to have high concentrations of inorganic material, the calcining zone is better suited for burning such materials than the primary burner. The mineral bed is not reactive outside the calcining zone near the primary burner; therefore, inorganics which fall in this area are not chemically bound into the matrix. As a result, burning solid materials in the primary burner may be subject to limitations dictated by the deductibility of toxic constituents in the finished cement and kiln dust. Prevailing technology has shown that as much as 40% of a kiln's fuel demand can be satisfactorily burned in the calcining zone. The apparatus and methods to be presented herein represent improvements in the prevailing technology by demonstrating that waste materials can be burned most effectively in a cement kiln's calcining zone by continuously feeding material in a completely controlled manner without the need for prior containerization of the material and further that the introduction of additional combustion air into the calcining zone allows for an improvement in the quantity of fuel that can be burned in the zone as compared to the current technology. In addition, methods and ancillary equipment are presented which allow for receiving and processing bulk quantities of waste materials, directly from the generators, prior to simultaneously feeding from two or more sources to the kiln input.

SUMMARY OF THE PRESENT INVENTION

The present invention is directed to an apparatus and methods of receiving material, such as solid hazardous waste, on an intermittent basis and metering such material in a continuous and controlled manner into the interior of a rotating cement kiln for burning, without creating any back fire hazards, from a stationary location. The metering apparatus includes a screw feeder and a conveying means for continuously supplying the metering apparatus with hazardous waste and/or non-hazardous materials having BTU value from multiple sources. The screw feeder, in the case of dry kilns, is attached directly to or appropriately supported adjacent to the stationary riser duct connecting the kiln to the preheater tower thus providing direct coupling to the screw feeder's extension tube which is integrally mounted into the kilns riser duct and extends directly into the calcining zone. The screw feeder serves as both shredder and feed device and is capable of feeding both solid and sludge materials, and with some variations, can be used to feed liquids as well. It has also been discovered that a continuous feed system of this nature could be employed which replaces the screw feeder with one or more linear rams operating singularly or in tandem. In which case the ram(s) would push the waste material into the kiln at a fixed predetermined rate. Both systems utilize a compaction process which produces a solid slug of material serving as a plug in the extension tube at any given time. Thus preventing back fire and escaping gases. A means for supplying forced air around the liner of the feeder tube or in its close proximity is provided to allow for complete combustion of the material upon entry into the kiln. It is essential to note that only a continuous feed system is capable of handling multi-process streams of material, such as soil, having virtually no Btu value mixed with substances such as tire derived fuel. The Boiler and Industrial Furnace regulations require that any automatic, waste feed, cut-off system must be activated if the kiln stack discharge limits are exceeded. Therefore, this system guarantees an uninterrupted feed of fuel grade material into the kiln even if the automatic waste feed cut-off of the hazardous waste system occurs. Thus, the range of materials utilized by the kiln is significantly broadened by a simultaneous feeding arrangement. The feed system can be furnished with additional equipment to enable the pre-processing of waste obtained directly from generators. The pre-processing system shreds and blends both drummed and bulk waste to produce a consistent fuel suitable for feeding into the kiln. Even liquids and sludge can be blended with solids to produce a type of "mud" suitable for feeding. With this system waste can be routed directly to the kiln without the need for other facilities to process and blend the waste. Without the pre-processing system, the feed unit is dependent upon other facilities to pre-process the material prior to arrival on site.

An object of the present invention is to provide an improved method and apparatus for the use of a solid waste material as a secondary fuel introduced into a dry rotary cement kiln at a stationary point at the riser duct connecting the kiln to the preheater tower, thus providing direct access by the feeder's extension tube into the precalcining zone.

Another object is to provide an improved method and apparatus for the introduction of solid waste materials as fuel which does not require containerizing or pre-packaging of such material prior to feeding.

A further object is to provide an improved method and apparatus for use of solid waste material as fuel for rotary kilns which does not require preshredding of the solid material before feeding to the delivery system.

A still further object of the invention is to provide an apparatus and method of supplying a constant, energy input into a rotary kiln by utilizing and controlling two or more materials by the fuel delivery system so that a constant, heat input into the kiln results. It is object of the present invention to provide various ways of introducing a continuous feed of solid materials into the calcining zone of a rotating cement kiln from a stationary position. It is also an object of the present invention to provide for the controlled introduction of waste materials in shred, powderized or liquified forms on a continuous basis directly into the kiln's calcining zone. A further object of the present invention is to provide for the feeding of truck load quantities of material which have been preshredded to a three to four inch diameter particle size. The invention is equally capable of receiving and feeding shred drums (including drum metal), API separator sludge, contaminated soil, tire chips, and virtually anything that can be shredded thus making it possible to handle large quantities of bulk material which have proven impractical with the prevailing technology. It is still a further object of the present invention to provide for the continuous mixing of bulk material so that the properties of the fuel remain consistent throughout the feed cycle. Another object is to provide for the simultaneous feed of material from several sources at once (i.e. feeding tire derived fuel or any consistent BTU material simultaneously with hazardous waste). A further object of the present invention provides a method of controlling the Btu fluctuations of the hazardous waste thus providing a constant BTU input into the kiln regardless of the type of material being utilized thereby promoting consistent conditions within the kiln, desirable by the kiln operators. Another object of the present invention provides for the BTU input into the kiln to be maintained constant even if the hazardous waste feed system is instantaneously shut down thus guaranteeing consistency. Still another object provides several methods for feeding waste materials into the kiln's calcining zone in a continuous fashion that is completely controlled by the kiln operator thus promoting steady, state conditions within the kiln and consistent replacement rates in the 40% range which can be easily maintained allowing for even heavier loading of inorganic in the waste derived fuel. A further object of the present invention provides for a reduction in particle size of materials being fed so that the final consistency entering the kiln is extremely fine and whereby combustion air is provided directly in proportion to the feed rate of material, thus creating optimum conditions necessary to ensure complete combustion of the fuel and the overall thermal efficiency of the kiln, since excess combustion air need not be fed at the primary burner. Still a further object of the invention is to provide for increased protection of human health and safety through the use of inert gas blanketing of the in feed materials and extensive monitoring throughout the system. It is also an object of the present invention to provide optional equipment which enables the pre-processing of waste obtained directly from the waste generators. The ancillary, pre-processing system is capable of shredding and blending both drummed and bulk waste to produce a consistent fuel suitable for introduction via the feed system into the kiln. Even liquids and sludge can be blended with solids to produce a type of "mud" suitable for feeding. Another object of present invention allows waste materials to be routed directly to the kiln without the need for other facilities to process and blend the waste; thus, the feed unit is not dependent upon other facilities to pre-process the material prior to arrival on site.

BRIEF DESCRIPTION OF THE DRAWINGS

These and other objects and advantages are herein after disclosed and explained with references to the drawings herein:

FIG. 5 is a partial, vertical, cross-section view of a rotary cement kiln of the preheated/precalcining type illustrating a single ram feeder apparatus.

FIG. 6 is a partial, vertical, cross-section view of a single ram, feeder apparatus illustrating the charging sequence of the cylinder stroke.

FIG. 7 is a partial, vertical, cross-section view of a single ram feeder apparatus illustrating the charging sequence of the cylinder stroke and blocking of the feed hopper.

DETAILED DESCRIPTION OF THE PREFERRED EMBODIMENT

Figure 1:
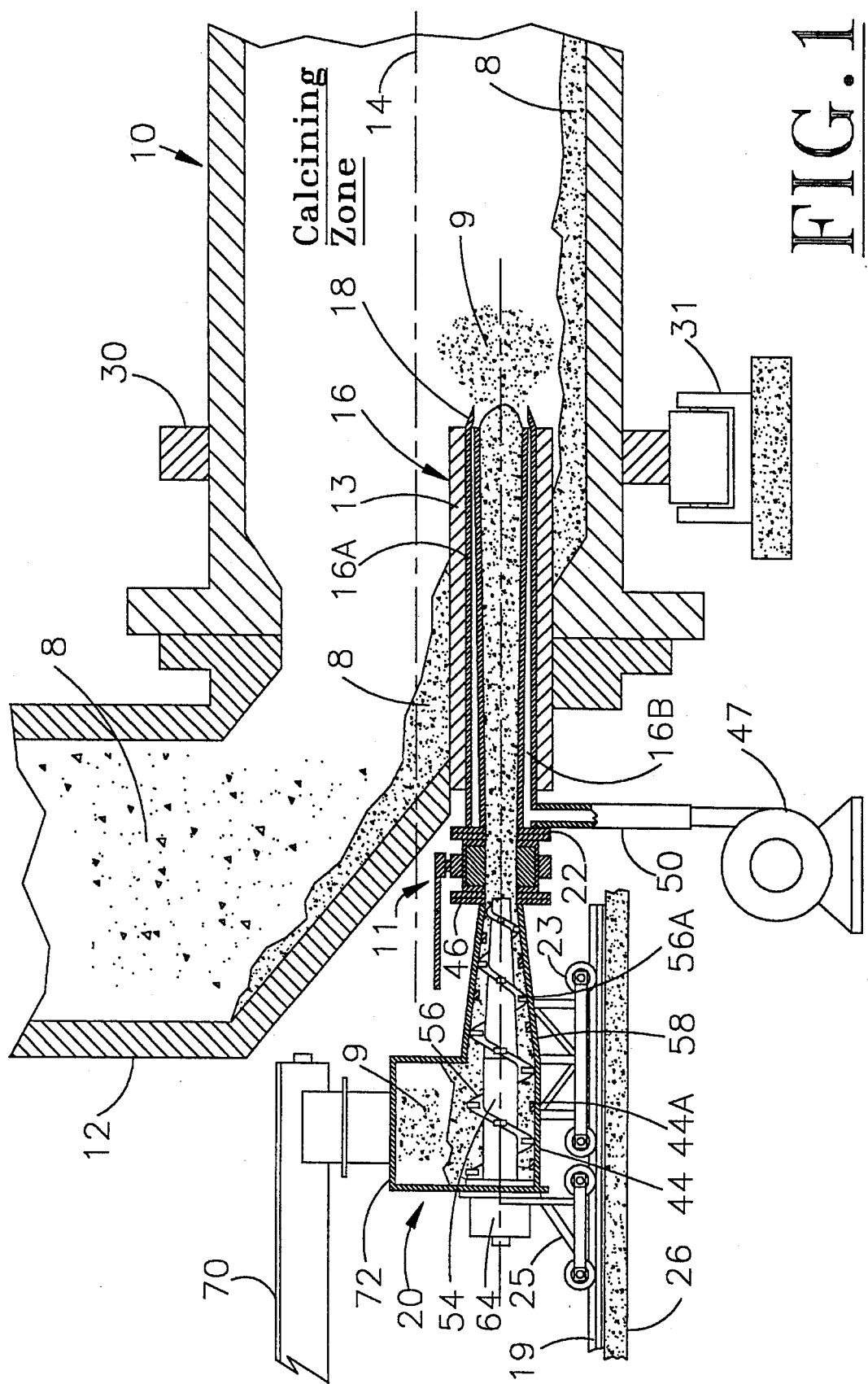
FIG. 1 is a partial, vertical, cross-section view of a rotary cement kiln of the preheated/precalcining type with the preferred embodiment of the improved solid waste feeding system adapted thereto.
Figure 2:
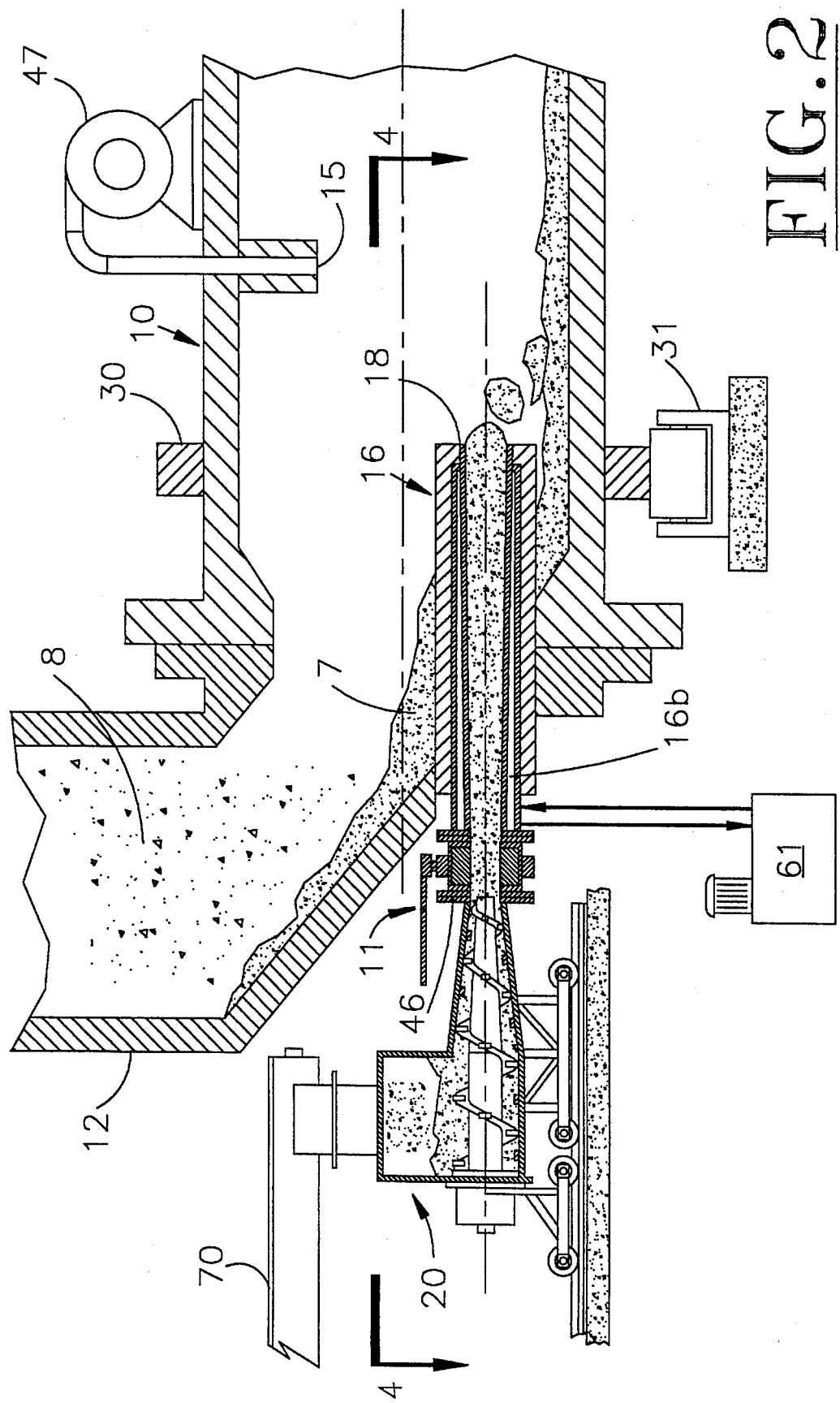
FIG. 2 is a partial, vertical, cross-section view of a rotary cement kiln of the preheated/precalcining type illustrating a discharge tube cooling system and a combustion air blower which is rotatable with the rotating kiln.
Figure 3:
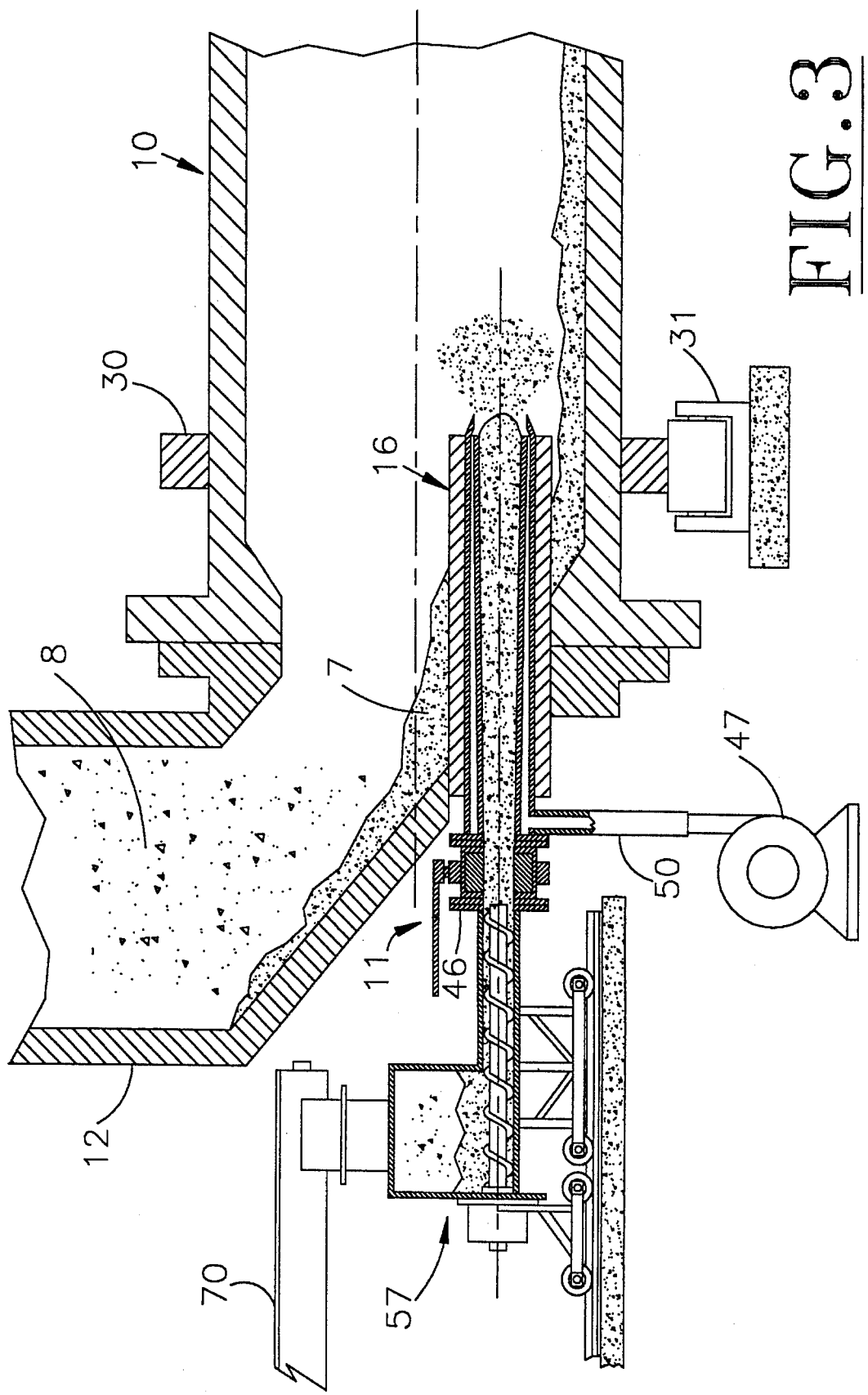
FIG. 3 is a partial, vertical, cross-section view of a rotary cement kiln of the preheated/precalcining type illustrating a straight screw feeder unit and a combustion air arrangement utilizing an annulus jacket surrounding the discharge tube.
Figure 4:
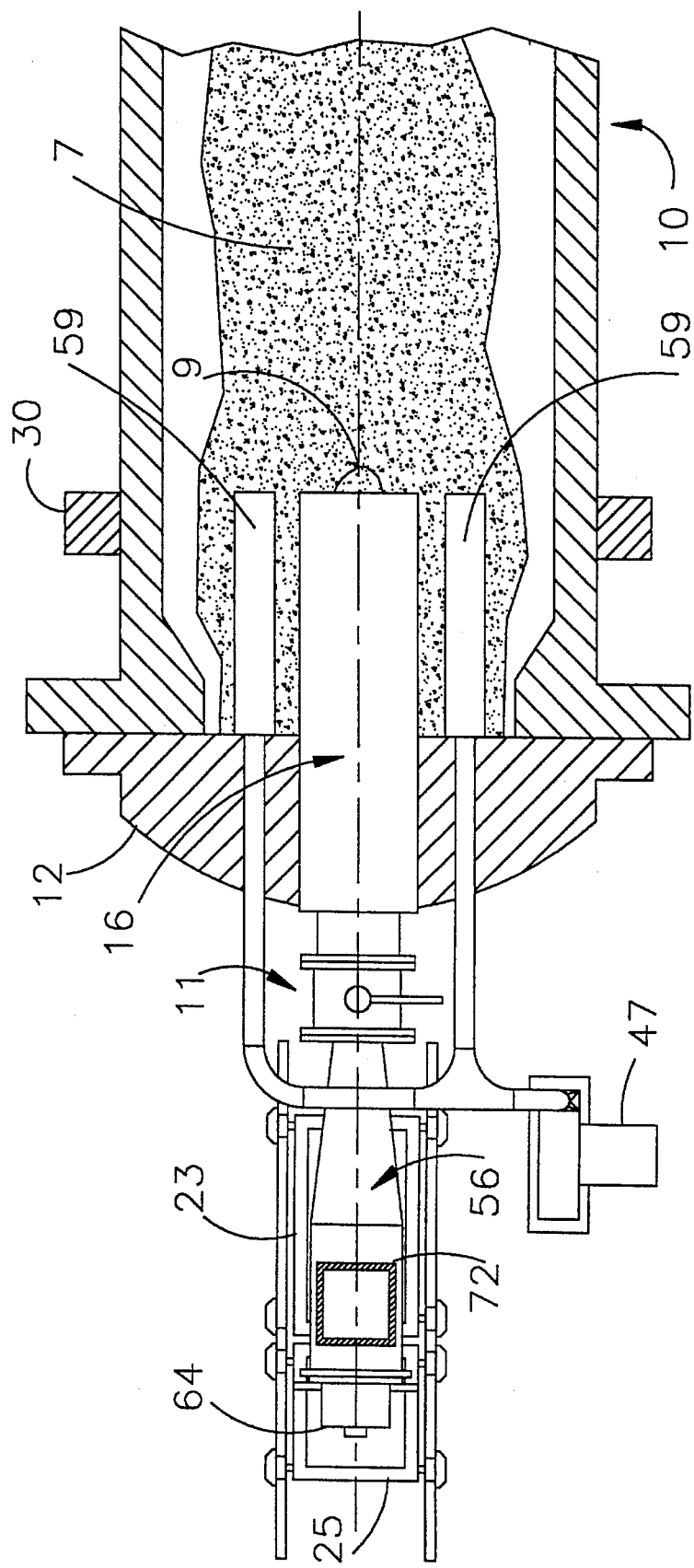
FIG. 4 is a partial, cross-section, view of a rotary cement kiln of the preheated/precalcining type taken along sight line 4—4 in FIG. 2 illustrating a combustion air arrangement utilizing a pair of injection tubes penetrating the kiln along both sides of the discharge tube.
Figure 8:
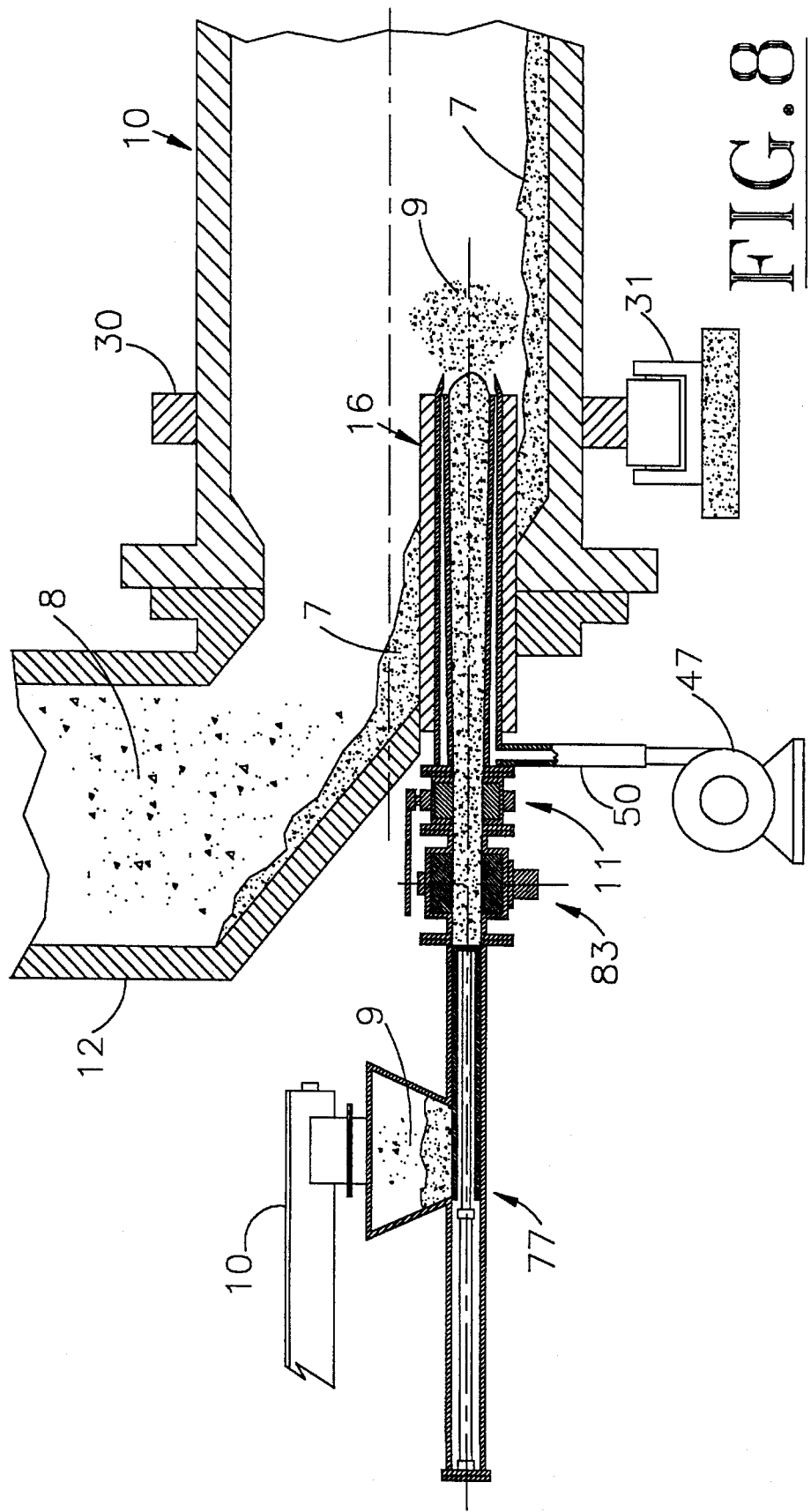
FIG. 8 is a partial vertical cross-section view of a rotary cement kiln of the preheated/precalcining type illustrating a dual ram, feeder apparatus and its shuttle valve.
Figure 9:
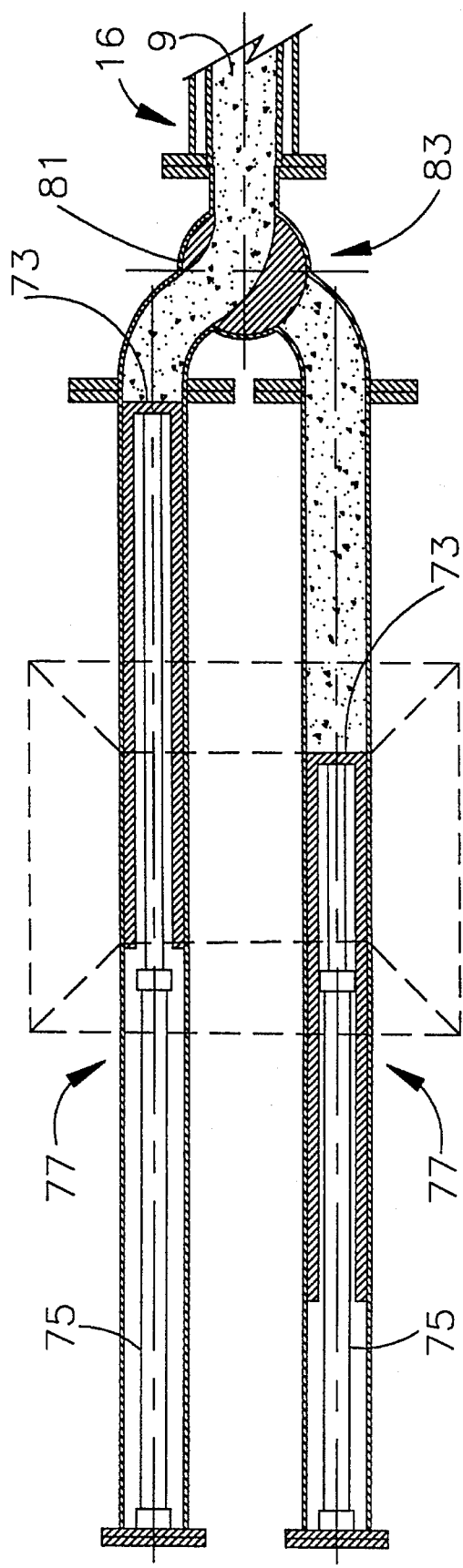
FIG. 9 is a partial, cross-sectional, plan view of the dual ram feeder apparatus illustrated in FIG. 8, illustrating the charging sequence of each cylinder stroke and the material path through the shuttle valve.
Figure 10:
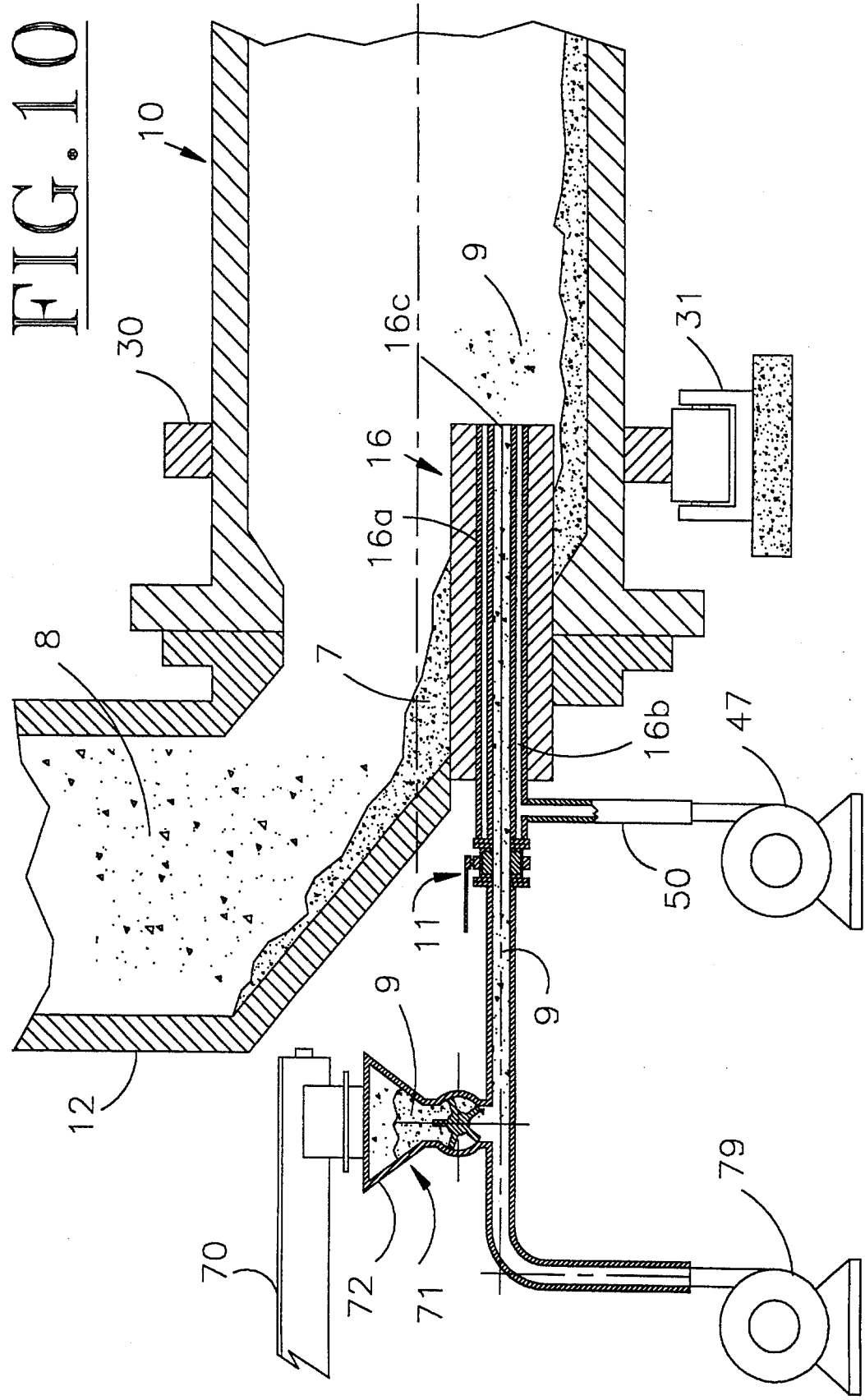
FIG. 10 is a partial, vertical, cross-sectional view of the pneumatic feeder apparatus illustrating the rotary feed metering system.
Figure 11:
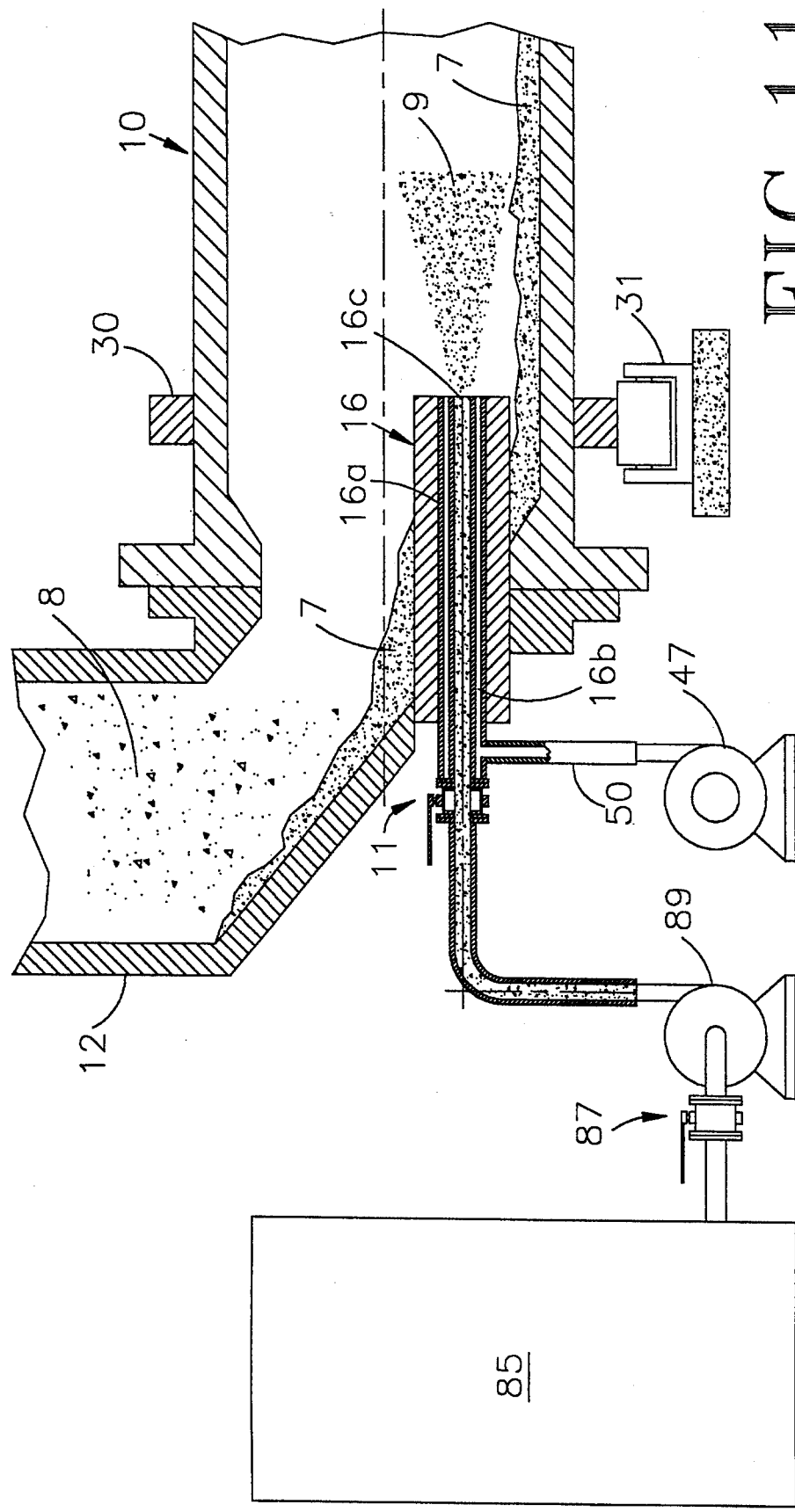
FIG. 11 is a partial, vertical, cross-sectional view of the entrained solids, liquid feed pump apparatus.
Figure 12:
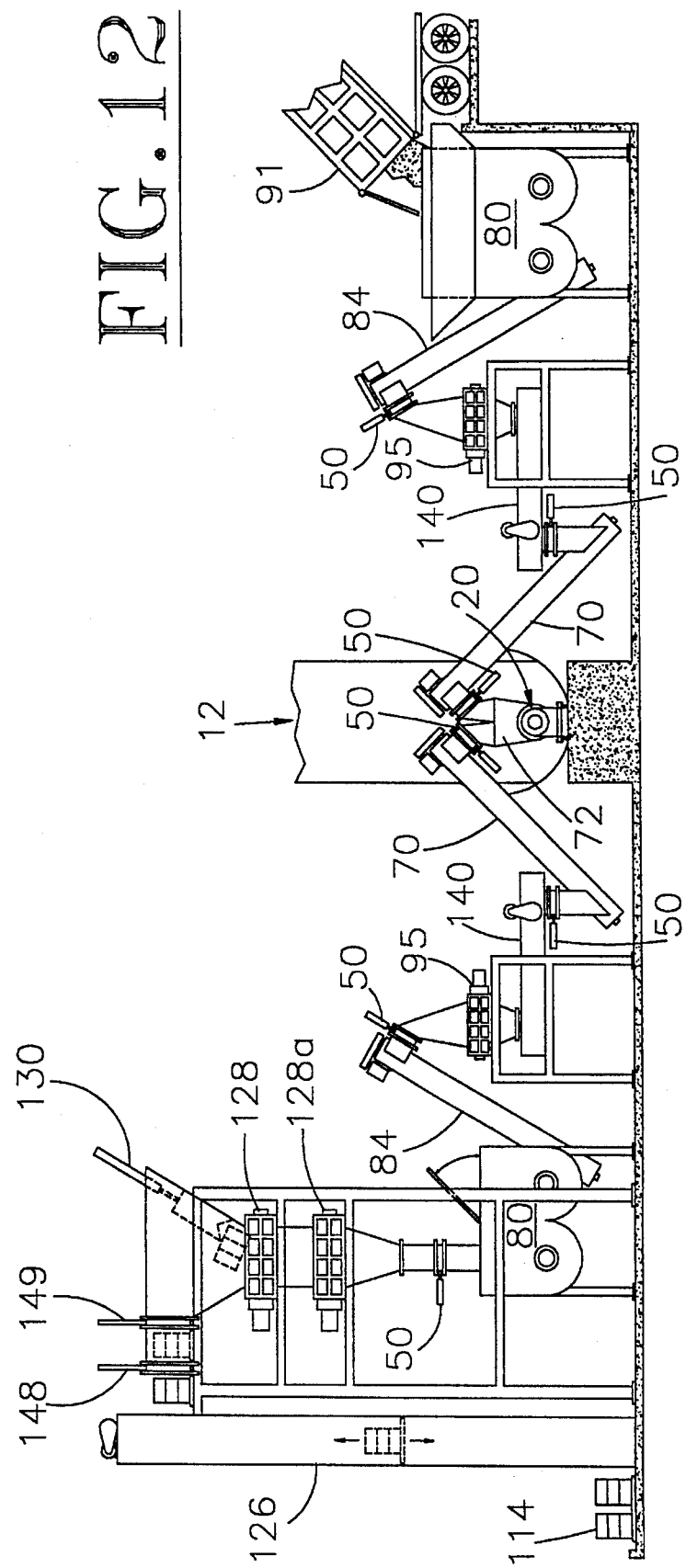
FIG. 12 is a vertical, elevation view of the dual receiving and processing feed system.
Figure 13:
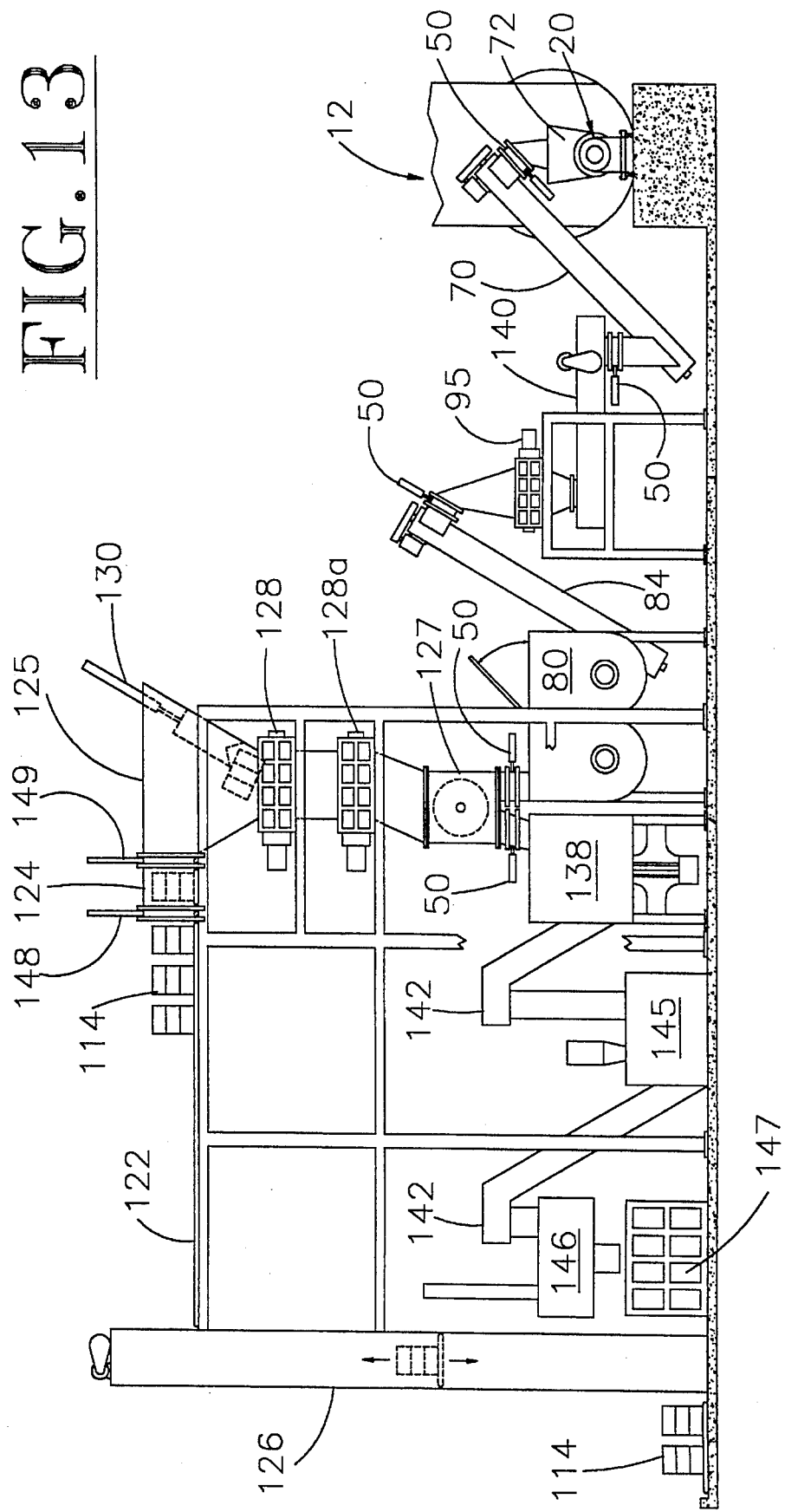
FIG. 13 is a vertical, elevation view of the optional, containerized receiving and processing system and the contaminated metal separation and processing unit.

Referring to FIG. 1, a generally cylindrical, tubular furnace device or kiln 10, such as a dry type cement kiln is illustrated. Typically kilns, in general, are tubular and are mounted on trunnion wheels 30 and support bearings 31 rotationally driven about the kiln's center line 14. In dry type cement kilns, a stationary, preheater/precalciner, riser duct 12 is rotatably attached to the rotary cylinder kiln 10 thereby providing for both the in-feed of cement materials and the exhaust of hot gases. The present invention's in-feed mechanism 20 and its extrusion or discharge tube 16 is shown mounted within a layer of refractory material 13 which is integral with the kiln's 10 preheater/precalciner, stationary riser duct 12. The extrusion or discharge tube 16 extends through the outer wall of the riser duct 12 and into the interior of the kiln sufficiently to prevent cement material 8, being discharged in the kiln through the riser duct 12, from clogging or interfering with the discharge of waste material 9 being extruded from the outlet 18 of the extrusion or discharge tube 16. The extrusion or discharge tube 16 which is located in the calcining zone and is sufficiently close to the cement material inlet so that the heat it provides substantially lessens the fuel requirements of the primary burner, normally fired at the opposite end of the kiln 10. The extrusion or discharge tube 16 is surrounded by a casing 16a thereby forming a cavity decreasing in area from the flange end 22 to the discharge end 18, thus providing a restrictive combustion air annulus 16b around the discharge tube 16. The feed mechanism 20 is detachably coupled to an isolation valve 11 which is connected to the inlet end 22 of the extrusion tube 16. As shown and described herein, generally, the screw feed mechanism 20 is both a shredder and a continuous feed device. It is essentially a tapered screw auger that is powered by a variable speed, hydraulic drive motor 64 mounted at the large end of the feed screw 54. The feed or inlet chute 72 to the screw feed mechanism 20 is positioned above the hydraulic drive motor 64 and its screw flighting 56. The sides of the inlet chute 72 may be lined with replaceable wear strips if desired. The feed screw 54 and its flighting 56 have adequate pitch to push material into the tapered end 58 of the feed mechanism 20. This feature allows the feed screw 54 to shred waste material 9 and to quickly transfer it into the extrusion tube 16. This arrangement also allows the processing of viscous or sticky material that would otherwise cause handling problems. The main feed screw 54 revolves inside and below the feed or inlet chute 72 and contains stationary breaker bars 44a around the inside perimeter of the housing 44. In this way, waste material 9 is shredded and torn as it becomes lodged between the revolving screw teeth 56a, located on the flighting 56, and the stationary breaker bars 44a. The tapered screw or auger feed screw 54, located within feeder housing 44, and its flutes 56, secured to feed screw 54, co-act with tapered walls 58 of housing 44 converging toward the outlet or discharge flange 46 thus compacting the waste feed material 9 and forcing it into and through the valve 11 and extrusion tube 16. The interior of the tapered, generally conical, wall 58 of housing 44 may also be provided with breaker bars 44a to help shred the waste feed material 9 between the periphery of screw flutes 56 and stationary breaker bars 44a in the event that shredding is desirable. However, if shredding is not required, a straight screw feed augur 57 may be employed as shown in FIG. 3 or else the breaker bars 44a, 56a may be omitted. It should be noted that clearance between the auger feed screw 54 and its tapered housing 58 is closer at the entrance to housing 44 and at the exit end at flange 46 than at its midsection. Such close tolerance at the entrance and exit ends insures a positive, no slip thrust of materials flowing through the extrusion tube 16. The wide mouth hopper above and adjacent the feed screw 54 functions as a storage area where material is continuously being feed, shredded, recirculated, and mixed until it is fed into the extrusion tube 16. Decreasing cavity progression also insures a very fine particle size by the time the material enters the kiln 10. The shredding feature is not essential to the successful operation of the feed system, but it broadens the range of materials that can be fed and produces a finer particle size to promote efficient combustion. As the main feed screw 54 rotates, it simultaneously conveys waste material 9 towards the kiln 10 through the slightly flared extrusion tube 16. The screw auger stops at the smaller end of the conical housing 58, but it has the power to push a plug of material down the length of the extrusion tube 16 and into the kiln 10. The drive motor 64, preferably hydraulic, for driving the feed screw 54 is located outside the feeder housing 44. The feed mechanism 20 and drive motor 64 are mounted on retractable support carriages 23, 25. The carriages are rollable on tracks 19 supported on a concrete base 26 elevated above ground level. Discharge flange 46 of the feed mechanism 20 is connected to the extrusion or extrusion discharge tube 16 thus the feed mechanism 20 may be disconnected from the kiln's riser duct 12 by closing the isolation valve 11 thereby closing the inlet 22 to the extrusion discharge tube 16 and permitting relative movement between the riser duct 12 and feed mechanism 20. The screw feed drive motor 64 and the screw feed shaft 54 may be removed without disturbing the screw feed housing 44. An air blower 47 may be connected to the combustion air annulus 16b via the air fitting 50 as seen in FIG. 1. This arrangement eliminates the need for excessive air at the primary burner, located at the opposite or product discharge end of the kiln 10. As discussed above, the volume of air needs to be controlled and feed directly into the calcining zone to aid in combustion taking place in the calcining zone, thus improving the quality of the product material 7 and increasing over all efficiency. Annulus air discharged at the nozzle end 18 serves to cool the discharge tube 16 and further helps break up and spread the waste material 9, during combustion, thereby providing a better mix with the mineral bed 7. Variations of this concept can be seen in FIG. 2–4. As seen in FIG. 2 the air annulus 16b around the discharge tube 16 is sealed adjacent the nozzle end 18 in which case a coolant may be circulated in the air annulus 16b around the discharge tube 16 by a coolant pump and reservoir 61. In this case combustion air may be supplied by a blower 47 mounted on the revolving tubular kiln 10 discharging ambient air directly into the drum's calcining zone through an orifice 15 as shown in FIG. 2. This produces complete combustion and still allows for more compaction in the discharge tube 16. As seen in FIG. 4, air from a combustion air blower 47 may be duct directly into the kiln's calcining zone at either side of the discharge tube 16 through combustion air tubes 59 located at either side of the discharge tube 16. A flow measuring device (not shown) may be used, if desired, to monitor the rate of flow of waste feed material 9 through the discharge tube 16 and into the kiln 10. Such devices may be conveniently mounted adjacent the feed discharge flange 46 of the feed mechanism 20. Waste material 9 may be fed into the kiln 10 by several methods depending on the type of material generally being used. As seen in FIG. 5, a single ram injection, feed unit 77 is employed which utilizes a tubular sleeve 73, housing and internal hydraulic ram 75 which moves the tubular sleeve 73 forward and backward as better illustrated in FIGS. 6, & 7. As seen in FIG. 6, the sleeve 73 is moved forward by the hydraulic ram 75 thus moving a slug of the waste material 9 forward toward the discharge tube 16 as shown in FIG. 7. As the sleeve 73 retracts, waste material 9 is deposited in the feeder tube ahead of the sleeve 73 in preparation for the next extension stroke. As seen in FIGS. 8, & 9, a continuous feed, dual ram injection, feed system may also be employed thus insuring a smooth flow of material and good compaction in the discharge tube 16. As seen best in FIG. 9, the same feed unit as shown in FIGS. 6 and 7 are employed. However, a shuttle or diverter valve 83 is installed at the juncture 81 of the two feed units 77. It should be noted that a material plug is created in the extrusion tube 16 as a result of forcing waste material 9 into the discharge tube 16 via the screw feed mechanisms 20, 57 or by ram mechanism 77 as shown in FIGS. 5–9. This material plug provides a barrier which prevents heat and gas from escaping from the kiln during continuous feeding. However, as seen in FIG. 10, a constant velocity, pneumatic blower 79 may be employed in conjunction with a rotary feeder 71 to provide a continuous, moving stream of waste material 9 into the kiln 10. In this case finely ground solid waste materials 9, including many low BTU types, are pneumatically conveyed into the kiln 10 through a burner nozzle 16c. A combustion air blower 47 may be used to insure and regulate complete combustion by supplying secondary air through the annulus 16b to the nozzle 16c. Turning now to FIG. 11, we see a liquid fuel injection system which utilizes waste material with entrained low BTU solids. This system comprises a holding or receiving tank 85, a gate valve 87 and a pump 89 connected to the inlet of isolation valve 11. Again, secondary combustion air is supplied by the combustion blower 47 which supplies air via the annulus 16b to the nozzle 16c. This arrangement allows for very efficient burning of liquified waste materials which are not suitable for use by the kiln's primary burner. Waste material 9, delivered to the interior of the screw feed mechanism 20 by the incline screw conveyor 70 and discharged into the feed chute 72, may be a composite material comprised of toxic waste and low BTU solid fuel. As seen in FIG. 12, the in-feed chute 72 may be fed from separate sources via conveyors 70 from separate material sources. The fuel waste material may be delivered first to the stationary, collection/receiving, bins 80 in bulk by truck 91. It is then agitated by mixer paddles and fed to a screw conveyor 84. It is then lifted and discharged into a shear shredder 95 and deposited onto a weighing belt conveyer 140 which discharges into incline screw conveyer 70. Ultimately the fuel waste material is fed into the in-feed chute 72 and feed mechanism 20. Isolation gates 50 are provided between the incline conveyor 84 and the shredder 95, between the belt conveyor 140 and incline screw conveyor 70 and between the incline conveyor 70 and the feed chute 72. The hopper 80 is equipped with two hydraulically operated doors which open to accept a load of material. After receiving the material, the doors close and the mixing bin is gas charged. Toxic waste may be fed in a similar manner from a second receiving bin or may be received in a number of different methods. FIG. 13 discloses a complete system for feeding both a bulk fuel, such as shredded, tire derived, fuel and toxic waste materials to a typical cement kiln 10. Toxic waste material is delivered to the toxic waste, continuous processing section 122 in drums or other such containers 114 and is conveyed via the elevator tower 126, here it is conveyed to a sealing gate or air lock 124 located adjacent the shredder chamber 125. The air lock 124 comprises a chamber having an outer door 148 and an inner door 149. The air lock's inner door 149 is connected to the shredder chamber 125 whereas the outer door 148 enables containers to enter the air lock 124. In operation, the outer air lock door 148 opens and up to 12 drum containers 114 may be conveyed into the air lock chamber 124. When the outer door 148 closes, the chamber is blanketed with inert gas. When the oxygen content is sufficiently low, the inner door 149 opens, and the drum containers are conveyed into the shredder chamber 125 where they are fed into the shredder 128. The inner air lock door 149 must be closed before the outer door 148 can open so that the shredder chamber 125 is never exposed to the atmosphere.

The shredder 128, 128a for the toxic waste processing is preferably a dual shaft, shear shredder, mechanism capable of accepting large, bulky containers such as steel drums and reducing such bulk to small particle size in one shredding step. Inside the shredder chamber 125, the containers 114 are forced into the primary shredder 128 by a ram 130. The shredded material may be reshredded by a secondary shredder 128a to insure uniform consistency. The toxic waste materials contained in containers 114 is then submitted to one or more magnetic, separator units 127 which separates shredded metal from the waste material 9. The toxic waste 9 is directed to the in-feed bin 80 where it is agitated and mixed before being conveyed to the feed mechanism 20. Metal from the magnetic separator 127 is diverted to a metal dispersion unit 138 where the metal particles, which are typically covered with waste material which must be removed before becoming acceptable scrap metal, are cleaned in a solvent. The violent agitation action occurring within the dispersion unit 138 tends to remove most of the residual waste material from the metal and to grind the waste, thus entraining the fines in the liquid solvent, sufficiently suitable for use as blended fuel in the kiln 10. A magnetic screw conveyor 142 transports the metal from the dispersion unit 138 to as many secondary wash modules 145 as necessary to remove all contaminates from the metal. The metal is then conveyed via magnetic conveyors to a hot air or steam dryer 146 where the metal is finally decontaminated and passed to the scrap metal bin 147. The waste materials are processed completely in a controlled environment throughout the processing section 122, such as in a nitrogen atmosphere or other suitable atmosphere from which combustion air is excluded. The entire processing system atmosphere may be blanketed with inert gas, such as carbon dioxide, or nitrogen, through an oxygen monitoring and control system. In addition, the temperature inside the unit may be monitored for unexpected temperature rises due to chemical reactions or fire. The unit may also be provided with a self activating fire suppression system utilizing halon, carbon dioxide, or foam. A liquid carbon dioxide system may be preferred because it has the ability to instantaneously cool a run away chemical reaction. The processing system, drum container air lock, and bulk feed bin 80 are vented to the kiln 10 through a conservation vent and detonation arrestor so that over-pressurization and gas displacements can be vented through the kiln's primary burner. Finally, air lock enclosures may be furnished with explosion hatches to relieve emergency pressures. A video camera may be mounted in the shredder 128 air lock so that feeding rates to the shredder can be monitored and adjusted by the operator. The simultaneous dual feed system, as shown in FIG. 12 can produce many benefits. For example, a preshredding feed bin 80, feeding tire derived fuel (or any material having consistent heating value properties), used in conjunction with a processing system feeding hazardous waste would have the combined ability to provide a constant Btu input into the kiln 10. The BTU value of tire derived fuel averages 15,000 BTU per pound, and the feed rate of such material could be varied to level any BTU fluctuations that occur from the hazardous waste processing system. This means that even contaminated soil having virtually no Btu value can be successfully utilized by the kiln 10 when fed simultaneously with tire derived fuel. The USEPA Boiler and Industrial Furnace regulations require that an automatic, waste feed cut-off system must be activated if the, kiln stack, discharge limits are exceeded. An additional benefit of this arrangement is to guarantee an uninterrupted flow of waste material into the kiln 10 even if the automatic, waste feed cut-off of the hazardous waste system occurs. In this case, the feed rate of tire derived fuel would simply increase to make up for any loss of fuel from the hazardous waste processing system. The net result of this simultaneous feed is to produce stable and consistent feed conditions even if the properties of the materials vary. The range of materials that can be utilized by the kiln 10 is significantly broadened by this simultaneous feeding arrangement. With the use of an electro-mechanical, flow meter to measure the volumetric flow rate of waste material 9 into the kiln 10, the speed of the feed screw 54 auger's rotation can be varied to yield any desired flow rate. The screw feed mechanism's 20 control system is self regulating and is capable of responding to any input rate into the kiln drum 10. The extrusion tube 16, being an annular pipe arrangement whereby solid material 9 is pushed by the feed screw 54 auger down the center of an outwardly flared discharge tube 16, causes the extrusion tube 16 to remain full of waste material 9 at all times even if the in-feed chute 72 in the screw feed mechanism 20 were to run dry. This creates a seven to eight foot long plug of material between the feed system and the internal temperatures of the kiln. This arrangement also enables the screw feed mechanism's 20 system to be separated from the kiln 10. As a result of the combustion air blower 47 supplying variable volume combustion air into the kiln 10 through the annulus 16b surrounding the extrusion tube 16, the solid plug of waste material 9 formed in the extrusion tube 16 remains cool until it is expelled into the calcining zone of the kiln 10. The combustion air travels at high velocities as it enters the kiln 10 and is deflected to impinge upon the solid fuel waste material 9 being extruded. This arrangement disperses the finely ground solids as they enter the kiln 10 where they auto-ignite, providing ideal mixing of fuel and air to promote efficient combustion. A hydraulic operator for the gate valve 11 may be used to isolate the kiln 10 from the in-feed system when liquid or entrained solids are injected. It will automatically close via accumulator pressure should the pneumatic blower 79 or fuel pump 89 in-feed systems fail.

What is claimed is:

1. An apparatus for the continuous feeding of combustible waste materials directly into the calcining zone mineral bed, of a precalcining type rotating cement kiln having a mineral infeed/exhaust riser duct comprising:
   a) a rotary dry type cement kiln cylinder, having a calcining zone adjacent a mineral in-feed/exhaust riser duct;
   b) a stationary extrusion tube, adapted to said in-feed/exhaust riser duct, extending into said calcining zone;
   c) a continuous combustible waste feed means, attached to said extrusion tube, for feeding and compacting said combustible waste material into a cake within said extrusion tube and forcing said compacted cake directly into said calcining zone mineral bed; and
   d) at least one continuous waste transfer means associated with said waste feed means for conveying waste material from a receiving station to said continuous waste feed means.

2. An apparatus according to claim 1 wherein said rotary cylinder is a rotary kiln, and said continuous waste feed means is a screw feeding apparatus.

3. An apparatus according to claim 2 wherein said screw feeding apparatus further includes a support carriage and means for transversely moving said screw feeding apparatus.

4. An apparatus according to claim 1 including means for flowing cooling air around said discharge tube and providing combustion air directly into said calcining zone.

5. An apparatus according to claim 3 wherein said screw feed apparatus includes means for shredding bulk material.

6. An apparatus according to claim 5 including means for metering material flowing through said screw feed apparatus.

7. An apparatus according to claim 6 including a closure mechanism interposed between said discharge tube and said screw feed apparatus.

8. An apparatus according to claim 1 wherein said discharge tube further includes a liquid cooling means for maintaining a plug formation in said discharge tube.

9. An apparatus according to claim 1 including a layer of refractory material surrounding said discharge tube within said stationary, in-feed riser duct.

10. An apparatus according to claim 1 including a means for receiving, processing and transferring bulk material to said continuous waste feed means.

11. An apparatus according to claim 10 wherein said means for processing and transferring said bulk material includes metering and weighing conveyors for delivering said bulk material to said continuous waste feed means.

12. An apparatus according to claim 10 wherein said processing and transporting means includes a means for delivering hazardous waste material to said feeding means in a nitrogen rich atmosphere.

13. An apparatus according to claim 12 including a means for processing and transferring containerized hazardous waste material to said feed means.

14. An apparatus according to claim 1 wherein said rotary cylinder is a cement kiln, and said materials are waste materials fed to the calcining zone of said cement kiln.

15. An apparatus according to claim 14 including a means for combining materials having a substantially consistent heating value with materials having low and inconsistent heating value for feeding to said calcining zone of said cement kiln.

16. The apparatus according to claim 11 wherein said means for processing and transferring said bulk waste material in an inert atmosphere to said feeding means comprises:
   a) a mixing bin for receiving and agitating bulk waste material;
   b) a shredder for reducing particle size of said bulk waste material;
   c) a first screw conveyor for transporting said waste material from said mixing bin to said shredder;
   d) a belt conveyor for weighing and transporting said waste material;
   e) an in-feed mixing hopper attached to said feeding means;
   f) a second screw conveyor for transporting said waste material from said belt conveyer to said in-feed mixing hopper; and
   g) a means for maintaining an inert atmosphere between said feeding means and said mixing bin.

17. The apparatus according to claim 16 wherein said means for transporting and processing said bulk waste material in an inert atmosphere to said feeding means further comprises:
   a) an air lock for receiving containerized hazardous waste;
   b) at least one shredder to shred said containerized hazardous waste;
   c) a means for conveying said shredded hazardous waste to said mixing bin; and
   d) a means for maintaining an inert atmosphere between said air lock and said mixing bin.

18. The apparatus according to claim 17 wherein said means for processing and transporting said bulk waste material in an inert atmosphere to said feeding means further comprises:
   a) a magnetic metal separating means located between said shredder and said mixing bin, for segregating contaminated metal from said hazardous waste;
   b) a dispersion means attached to said magnetic metal separating means for further reducing particle size and agitating said contaminated metal;
   c) a dispersant fluid circulated in said dispersion means;

d) at least one means for washing said contaminated metal;

e) a first magnetic conveyor means for transporting said contaminated metals from said dispersion means to said washing means;

f) a means for drying said contaminated metal; and g) a second magnetic conveyor means for transporting said contaminated metal from said washing means to said drying means.

19. An apparatus according to claim 1 including nozzle means for discharging combustion air used to cool said discharge tube directly into said calcining zone.

20. An apparatus according to claim 1 including means for injecting and controlling combustion air via tubes adapted to said in-feed riser duct, extending into said calcining zone.

21. An apparatus according to claim 20 wherein said means for injecting combustion air directly into said calcining zone of said rotary cylinder is a blower rotatable with said rotary cylinder.

22. The apparatus according to claim 1 wherein said in-feed means is a continuous feed, injection ram.

23. An apparatus according to claim 22 wherein said in-feed means is a pneumatic injector including a rotary material feeder.

24. An apparatus according to claim 1 wherein said in-feed means is a liquid pump for transferring entrained solids from a storage tank to said discharge tube.

25. A method of delivering compacted combustible waste material continuously into the calcining zone of a precalciner type, rotating, cement kiln cylinder having a stationary riser duct for receiving preheated mineral material including the steps of providing at least one stationary collection apparatus for receiving said waste material to be fed into said rotating cylinder, connecting thereto a feeding apparatus having an extrusion tube attachable thereto, penetrating said stationary riser duct with said extrusion tube, and fixedly extending said extrusion tube into said calcining zone, and during rotation of said cylinder, transferring said waste material from said stationary collection apparatus through said feeding apparatus, compacting said waste material within said extrusion tube and continuously forcing said waste material directly into the calcining zone of said rotating cement kiln cylinder for burning within mineral material.

26. The method according to claim 25 includes processing of waste material by agitating.

27. The method according to claim 25 includes the step of pneumatically injecting sludge into said discharge tube.

28. The method according to claim 26 including the step of controlling the volume by weight of said material being transferred from said stationary collection apparatus into said feeding apparatus.

29. The method according to claim 25 including the step of forcing said waste material into said discharge tube with a ram device.

30. The method according to claim 26 including the step of maintaining an inert atmosphere around said material at said stationary collection.

31. The method according to claim 25 including the steps of delivering a material having a substantially consistent heating value to said stationary collection, and delivering a waste material having little or no heat value to said stationary collection whereby both materials are incinerated or mixed with said mineral materials.

32. The method according to claim 25 including the steps of delivering a first material to said stationary collection which first material has known heating value, and delivering a second material to said stationary collection which second material has a heating value which is not desirable for delivery to said rotary cement kiln without the addition of said first material.

33. The method according to claim 32 including the step of controlling the amounts of each of said first and second materials to said stationary collection so that said materials, when burned, maintains the desired amount of heating to the interior of said rotating cement kiln cylinder.

34. The method according to claim 25 including the step of shredding said waste material within said screw feeding apparatus during its movement therethrough.

35. The method according to claim 25 including the step of providing a combustion air blower, rotatable with the exterior of said rotating kiln cylinder and injecting said combustion air directly into said rotating kiln cylinder's calcining zone.

36. The method according to claim 25 including the flowing of cooling air around the exterior of the feeding apparatus and into the rotating cylinder to cool the exterior of the feeding apparatus and to provide combustion air to the interior of the rotating cylinder.

37. The method according to claim 25 including the step of metering the amount of material being fed into said rotating cylinder.

38. The method according to claim 25 including the steps of receiving bulk materials, processing said bulk materials to provide a preselected size, blend said materials for use in a rotary cement kiln, and transferring said processed bulk materials to said rotary cement kiln in a continuous manner.

39. A method of delivering waste material on a continuous basis into the calcining portion of a rotating cement kiln of the precalciner type having a mineral bed including the steps of delivering waste material to be introduced into the cement kiln to a stationary collection and processing apparatus, transferring the material from said stationary collection apparatus to a stationary feeding apparatus having an extrusion tube attached thereto, feeding the material in a continuous manner through the feeding apparatus and extrusion tube, and discharging said material in a compacted form for incineration in the mineral bed.

40. A method of delivering material in a substantially, continuous manner into the calcining portion of a rotating cement kiln of the preheater or precalciner type having a mineral bed including the steps of delivering a fluidized material to be introduced into the cement kiln to a stationary collection apparatus, transferring the fluidized material from said stationary collection apparatus to a stationary feeding apparatus having an extrusion tube attached thereto, feeding the fluidized material through said feeding apparatus, and discharging the material as a continuous fluidic stream into said calcining zone of said kiln for incineration in the mineral bed.

41. A method according claim 40 for improving combustion of said waste material within said calcining zone comprising the steps of injecting air from a forced draft blower directly into said kiln's calcining zone, and controlling said forced air in a manner proportional to the BTU value of said waste material, thus insuring complete combustion.

42. A method of processing hazardous waste material prior to feeding said material into a rotary cement kiln comprising the steps of receiving said material in sealed containers, transferring said containers to an air lock connected to an inert gas atmosphere, sealing said air lock to ambient air, transferring said containers to a shredding unit also having an inert gas atmosphere, shredding said sealed containers and waste material, separating metals from said waste material, agitating and further sizing said metals in a dispersion unit, and washing and drying said metals.

* * * * *